US009398381B2

(12) United States Patent
Pedersen

(10) Patent No.: US 9,398,381 B2
(45) Date of Patent: Jul. 19, 2016

(54) HEARING INSTRUMENT

(71) Applicant: OTICON A/S, Smørum (DK)

(72) Inventor: Michael Syskind Pedersen, Smørum (DK)

(73) Assignee: OTICON A/S, Smorum (DK)

( * ) Notice: Subject to any disclaimer, the term of this patent is extended or adjusted under 35 U.S.C. 154(b) by 133 days.

(21) Appl. No.: 14/107,678

(22) Filed: Dec. 16, 2013

(65) Prior Publication Data
US 2014/0169601 A1 Jun. 19, 2014

Related U.S. Application Data

(60) Provisional application No. 61/737,840, filed on Dec. 17, 2012.

(30) Foreign Application Priority Data

Dec. 17, 2012 (EP) ..................................... 12197417

(51) Int. Cl.
*H04R 25/00* (2006.01)
*H04M 1/60* (2006.01)
*H04R 1/10* (2006.01)
*H04R 5/033* (2006.01)
*H04R 25/04* (2006.01)

(52) U.S. Cl.
CPC ............ *H04R 25/48* (2013.01); *H04M 1/6058* (2013.01); *H04R 25/552* (2013.01); *H04M 1/6066* (2013.01); *H04R 1/1033* (2013.01); *H04R 5/033* (2013.01); *H04R 25/04* (2013.01); *H04R 25/353* (2013.01); *H04R 25/407* (2013.01); *H04R 25/556* (2013.01); *H04R 2420/09* (2013.01)

(58) Field of Classification Search
CPC .. H04R 25/407; H04R 25/552; H04R 25/554; H04R 25/556; H04R 2420/07; H04R 2420/09; H04R 5/033; H04M 1/6058; H04M 1/6066
See application file for complete search history.

(56) References Cited

U.S. PATENT DOCUMENTS

| 2003/0235319 | A1* | 12/2003 | Rass | H04R 25/407 381/312 |
| 2009/0196454 | A1* | 8/2009 | Her | H04R 25/00 381/380 |
| 2010/0067721 | A1* | 3/2010 | Tiefenau | H04R 25/353 381/313 |
| 2010/0150356 | A1* | 6/2010 | Uzuanis | H04R 25/70 381/23.1 |

(Continued)

FOREIGN PATENT DOCUMENTS

EP 1 191 770 A2 3/2002
WO WO 2006/074692 A1 7/2006

*Primary Examiner* — Matthew Eason
(74) *Attorney, Agent, or Firm* — Birch, Stewart, Kolasch & Birch, LLP

(57) ABSTRACT

An audio system includes a headset and a portable computing device. The headset includes a first speaker and a first microphone, a second speaker, a second microphone and a processing unit. The first microphone and the second microphone output a first signal and a second signal, respectively. The processing unit combines the first electrical signal and the second electrical signal into a third electrical signal, and communicates the third electrical signal to a portable computing device through an output channel. The portable computing device preferably includes an application that separates the third electrical signal into the first electrical signal and the second electrical signal. The application compensates the first electrical signal and the second electrical signal for a hearing loss of an individual.

19 Claims, 6 Drawing Sheets

(56) References Cited

U.S. PATENT DOCUMENTS

| | | | | |
|---|---|---|---|---|
| 2011/0176697 A1* | 7/2011 | Apfel | ............... | H04R 25/305 381/314 |
| 2011/0317858 A1* | 12/2011 | Cheung | ............ | H04R 25/405 381/317 |
| 2013/0223661 A1* | 8/2013 | Uzuanis | ............ | H04R 1/1041 381/314 |
| 2013/0259241 A1* | 10/2013 | Schul | ................ | H04R 3/002 381/56 |
| 2015/0023536 A1* | 1/2015 | Scheller | ............ | H04R 25/30 381/315 |

* cited by examiner

HEARING INSTRUMENT

CROSS-REFERENCE TO RELATED APPLICATIONS

This application claims priority under 35 U.S.C. §119(e) to U.S. Provisional Application No. 61/737,840 filed on Dec. 17, 2012. This application also claims priority under 35 U.S.C. §119(a) to patent application Ser. No. 12197,417.4 filed in Europe on Dec. 17, 2012. The entire contents of all the above applications is hereby incorporated by reference.

BACKGROUND

1. Technical Field

This invention generally relates to hearing instruments. More particularly, the invention relates to an audio system implemented as a hearing instrument.

2. Related Art

An individual having difficulties in hearing or having partial hearing impairment may use a hearing aid to listen. The hearing aid is an electroacoustic device that may be designed to fit in the individual's ear. The hearing aid amplifies sound sufficiently for the individual to hear the sound. The individual may be interested in using portable electronic devices having audio output such as a mobile communication device, a music player, and the like, with the hearing aid. The individual may electrically connect the portable electronic device with the hearing aid or may use portable electronic device directly. In both instances, the individual has to use both the hearing aid and the portable electronic device. US2011317858 describes a hearing aid frontend device for frontend processing of ambient sounds and adapted for being worn by a user. The hearing aid comprises first and second sound collectors adapted for collecting ambient sound with spatial diversity. The sounds collected by the sound collectors are processed by a sound processor. The sound process comprises a digital signal processor for beamforming sounds collected by the first and second collectors, and the processed sounds are subsequently subject to adaptive noise cancellation.

SUMMARY

Disclosed is an audio system. The audio system includes a headset and a portable computing device. The headset includes a first output transducer, e.g. a speaker, a first microphone, a second output transducer, e.g. a speaker, a second microphone and a processing unit. The first microphone outputs a first electrical signal. The second microphone outputs a second electrical signal. The processing unit receives the first electrical signal, and the second electrical signal. The processing unit combines the first electrical signal and the second electrical signal into a third electrical signal. Further, the processing unit communicates the third electrical signal to a portable computing device through an output channel. Alternatively, the processing unit may be configured to communicate the first and second electrical signals via individual (e.g. third and fourth, or first and second output) channels. The portable computing device separates the third electrical signal into the first electrical signal and the second electrical signal, e.g. by means of an application (sometimes denoted an 'APP'), i.e. a software program executing on the portable computing device (or receives the first and second electrical signals directly). The portable computing device and/or the application processes the first electrical signal and the second electrical signal to compensate for a hearing loss of an individual of the audio system. The portable computing device and/or the application communicates the processed first electrical signal to the first output transducer, e.g. a speaker, through a first channel, and the processed second electrical signal to the second output transducer, e.g. a speaker, through a second channel. In the following, the term 'speaker' is used for the output transducer. In an embodiment 'the speaker' is a conventional (miniature) loudspeaker for converting an electric signal to an acoustic sound, such conversion comprising the generation of vibrations of air in a human audible frequency range (e.g. within the range from 20 Hz to 20 kHz). In an embodiment, the (output transducer) speaker is a vibrator for converting an electric signal to a vibration of a bone (e.g. the skull or a jaw) of a person, such vibrator e.g. forming part of a bone anchored hearing aid. In an embodiment, one or more of the (communication) channels is/are established via wireless link(s). In an embodiment, one or more of the (communication) channels is/are established via wired link(s). The links may be implemented according to standardized or proprietary schemes. In an embodiment, a wireless link may be implemented as an inductive link based on utilizing near-field properties of the electromagnetic field. In an embodiment, a wireless link may be implemented based on far-field properties of the electromagnetic field (radiated fields, RF) and e.g. complying with a communication standard. In an embodiment, the communication standard is classic Bluetooth as specified by the Bluetooth Special Interest Group (SIG). In an embodiment, the communication standard is another standard or proprietary protocol (e.g. a modified version of Bluetooth, e.g. Bluetooth Low Energy modified to comprise an audio layer).

The audio system helps the individual to use the portable computing device as a hearing aid in addition to general functions of the portable computing device. Further, the portable computing device can be used as or form part of a binaural hearing aid (e.g. in cooperation with the headset). It is an advantage that the individual does not have to use a separate hearing aid in conjunction with the portable computing devices.

In one embodiment, the headset is configured to be communicatively coupled to the portable computing device through a connector. In an embodiment, the connector includes a first speaker contact, a second speaker contact and a microphone contact. In an embodiment, the first speaker contact is coupled to the first speaker through the first channel. In an embodiment, the second speaker contact is coupled to the second speaker through the second channel. In an embodiment, the microphone contact is coupled to the processing unit through the third channel. It is an advantage that currently available portable computing devices with connectors having only one contact for microphone signals can be used together with the headset as a binaural hearing aid. In an embodiment, the connector comprises two (or more) microphone contacts. In an embodiment, the two (or more) microphone contacts are coupled to the processing unit through third and fourth (separate) channels. In an embodiment, the connector is configured to electrically connect the headset to the portable computing device via a wired connection, e.g. comprising a cable comprising a number of independent electrical conductors (insulated from each other), and corresponding connectors. In an embodiment, the cable comprises separate cables (or a split cable) for connecting the first and second earpieces of the headset with the processing unit and/or the portable computing device.

The portable computing device may be a mobile communication device, a portable music player, a personal digital assistant (PDA), or a laptop. Examples of mobile communication device include, without limitation, programmable mobile phones and cell phones, particularly smartphones on which applications, known as "APPs", may be installed and executed.

In one embodiment, the processing unit applies a low pass filter with a first cut-off frequency to the first electrical signal and the second electrical signal. The processing unit transposes the filtered first electrical signal by a first frequency shift to move the filtered first electric signal to frequencies above the first cut-off frequency. The first frequency shift should thus be equal to or larger than the first cut-off frequency. Further, the processing unit adds the (filtered and) transposed first electrical signal and the filtered second electrical signal to generate the third electrical signal.

In one embodiment, the portable computing device and/or the application separates the third electrical signal by applying a low pass filter with a cut-off frequency equal to the first cut-off frequency to the third electrical signal to obtain the second electrical signal. The portable computing device and/or the application applies a high pass filter with a cut-off frequency somewhere in the range between the first cut-off frequency and the first frequency shift to the third electrical signal. The portable computing device and/or the application transposes the high-passed filtered signal back to the original frequencies below the first cut-off frequency to obtain the first electrical signal.

In another embodiment, the processing unit applies a low pass filter with a first cut-off frequency to the first electrical signal and the second electrical signal. The processing unit generates a difference signal by subtracting the filtered second electrical signal from the filtered first electrical signal. The processing unit transposes the difference signal by a first frequency shift to move the difference signal to frequencies above the first cut-off frequency. Further, the processing unit adds the transposed signal and the first electrical signal and the second electrical signal to generate the third electrical signal.

In another embodiment, the portable computing device and/or the application applies a low pass filter to the third electrical signal with a cut-off frequency equal to the first cut-off frequency to obtain a sum signal corresponding to the sum of the first electrical signal and the second electrical signal. The portable computing device and/or the application further applies a high pass filter to the third electrical signal with a cut-off frequency somewhere in the range between the first cut-off frequency and the first frequency shift. The portable computing device and/or the application transposes the high-pass filtered signal back to the original frequencies below the first cut-off frequency to obtain the difference signal. Further, the portable computing device and/or the application adds the difference signal and the sum signal, to obtain the first electrical signal. The portable computing device and/or the application subtracts the difference signal from the sum signal to obtain the second electrical signal.

Disclosed herein is a data processing system. The data processing system includes a processor and program code means for causing the processor to receive an electrical signal from a headset through an input channel. The headset comprises a first speaker, a first microphone, a second speaker and a second microphone. The electrical signal is comprised of a first electrical signal output by the first microphone and a second electrical signal output by the second microphone. The program code means causes the processor to separate the electrical signal into the first electrical signal and the second electrical signal. The program code means causes the processor to process the first electrical signal and the second electrical signal to compensate for the hearing loss of the individual of the data processing system. The program code means causes the processor to communicate the processed first signal to the first speaker through a first channel, and the second signal to the second speaker through a second channel.

The program code means can be installed in any portable computing devices such as a mobile communication device, a portable music player, a personal digital assistant (FDA), or a laptop. Consequently, the individual can use a binaural headset with the portable computing devices to use the portable computing device as a hearing aid.

Disclosed herein is a hearing instrument. The hearing instrument includes a stereo headset and a portable computing device. The stereo headset includes a first earpiece, a second earpiece, a processing unit and a connector. The first ear piece includes a first speaker and a first microphone. The second earpiece includes a second speaker and a second microphone. The first microphone outputs a first electrical signal. The second microphone outputs a second electrical signal.

The processing unit is coupled to the first earpiece and the second earpiece. The processing unit receives the first electrical signal and the second electrical signal. The processing unit combines the first electrical signal and the second electrical signal into a third electrical signal. The processing unit communicates the third electrical signal to the portable computing device via an output channel. The connector is coupled to the first earpiece and the second earpiece, to connect the stereo headset to the portable computing device. The connector includes a first speaker contact, coupled to the first speaker through a first channel (e.g. to propagate a first processed electrical signal from the portable computing device). The connector also includes a second speaker contact coupled to the second speaker through a second channel (e.g. to propagate a second processed electrical signal from the portable computing device). The connector further includes a microphone contact coupled to the processing unit through the output channel (e.g. to propagate the third electrical signal to the portable computing device).

The portable computing device may include an application (APP). The portable computing device and/or the application separates the third electrical signal into the first electrical signal and the second electrical signal. The portable computing device and/or the application processes the first electrical signal and the second electrical signal to compensate for a hearing loss of the individual of the audio system. The portable computing device and/or the application communicates the processed first electrical signal to the first speaker through the first channel, and the processed second electrical signal to the second speaker through the second channel.

The hearing instrument can be used as a hearing aid by the individual with hearing difficulties, in addition to other functions of the portable computing device. It is an advantage that the individual does not have to use the known hearing aid in conjunction with the portable computing devices.

BRIEF DESCRIPTION OF THE DRAWINGS

The above and/or additional objects, features and advantages of the present invention, will be further elucidated by the following illustrative and nonlimiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
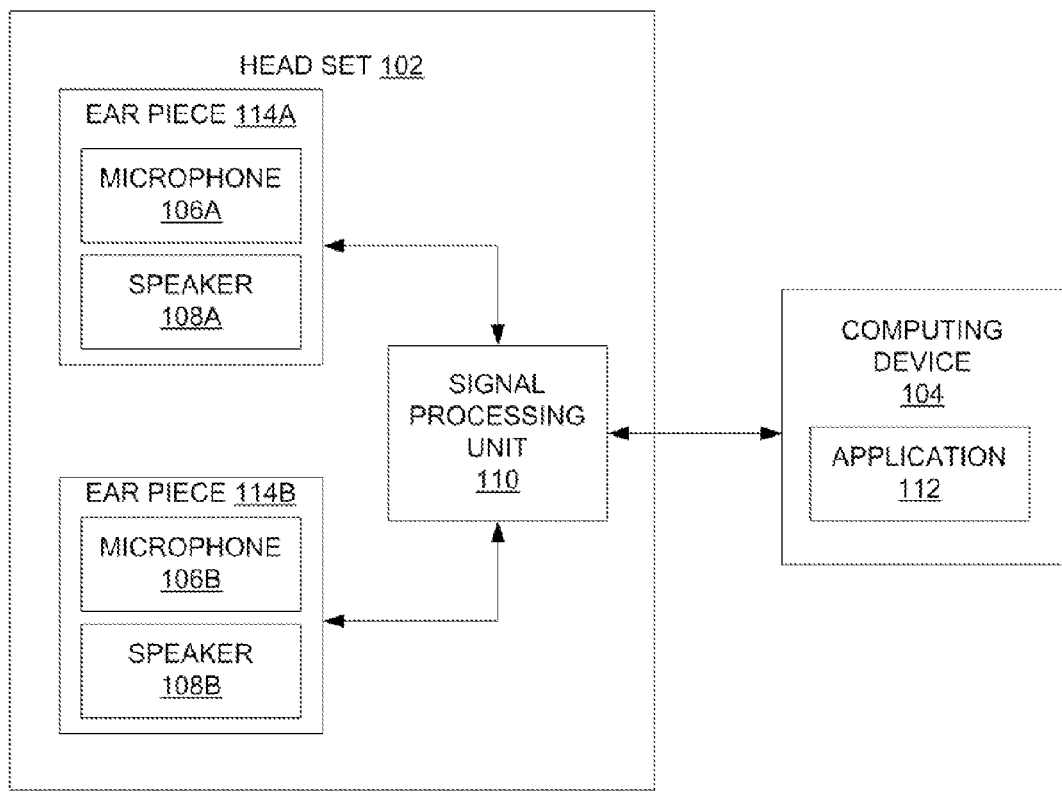
FIG. 1 shows an audio system, in accordance with an embodiment of the present disclosure.

FIG. 1 shows an exemplary audio system 100, in accordance with an embodiment of the present disclosure. The audio system 100 includes a headset 102 and a computing device 104. The headset 102 includes an earpiece 114A, an earpiece 114B and a signal processing unit 110. The earpiece 114A includes a microphone 106A and a speaker 108A co-located to each other. The earpiece 114B includes a microphone 106B and a speaker 108B co-located to each other. The microphones 106A-B and the speakers 108A-B may be communicatively coupled to the signal processing unit 110. The microphones 106A-B capture acoustic signals at audible frequencies. The microphones 106A-B transmit electrical signals corresponding to the acoustic signals to the signal processing unit 110 through a wired or wireless communication link. The microphones 106-B may be omnidirectional or directional microphones. Each of the earpieces 114 may include further microphones 106, e.g. a total of two or three microphones each, in order to allow direction-dependent processing of the audio signals by combining outputs from two or more of the microphones.

The processing unit 110 receives the electrical signals from each of the microphones 106A-B. In one embodiment, the processing unit 110 combines the electrical signals to generate a combined electrical signal. The processing unit 110 communicates the combined electrical signal to the computing device 104 via a single channel. In another embodiment, the processing unit 110 processes and communicates the electrical signals to the computing device 104 through separate channels.

The computing device 104 includes an application (APP) 112. The application 112 receives and separates the combined electrical signal into corresponding electrical signals. In an embodiment, the application 112 is a hearing aid application performing substantially all signal processing associated with a hearing aid. For example, the application 112 processes the separated electrical signals to compensate for a hearing loss of the (respective ears of the) individual of the audio system. The application 112 may also perform binaural signal processing, noise reduction, such as multi-channel noise reduction, acoustic feedback cancellation, automatic gain control, compression, and the like. The application 112 communicates the processed electrical signals to the speakers 108A-B of the headset 102. In one embodiment, the application 112 communicates the processed electrical signals to the speakers 108A-B corresponding to the microphones 106A-B at which the electrical signals were generated. Each speaker 108A-B may receive electrical signals corresponding to the acoustic signals through a corresponding channel. The speakers 108A-B may convert the processed electrical signals to the acoustic signals. The acoustic signals generated as a result of electrical signals at corresponding speakers enable the individual to perceive the directionality of a single or multiple sources of acoustics. In other embodiments, the enhanced electrical signals are communicated to both of the speakers after processing the electrical signals to eliminate distortion.

As described above, the computing device 104 may use the application 112 to separate the electric signals received from the headset 102 and compensate the electrical signals for the hearing loss. The application 112 as described above may be installed on the computing device 104 or accessed by the computing device 104 via a network. Alternatively, the computing device 104 may include circuitry to separate and compensate the electrical signals from the headset. In another alternative, the computing device 104 may include the circuitry and the application 112 to separate and compensate the electrical signals. In one embodiment, the portable computing device and/or the application 112 may use a hearing profile of the individual to process the electrical signals. The hearing profile may refer to information that includes hearing range of the individual, i.e. the level range between the hearing threshold and the uncomfortable level of the individual. This range is typically frequency-dependent. For example, an individual with a sensorineural hearing loss may not be able to hear sounds of low intensity and may have difficulty in hearing sounds of moderate intensity such as conversational sounds. The hearing range for the individual based on above example may be moderate to loud sound. Using the hearing profile of the individual, the portable computing device and/or the application 112 may process the electrical signals to compensate for the hearing loss of the individual. The hearing profile may be stored in the computing device 104. In another embodiment, the portable computing device and/or the application 112 may dynamically compute the hearing profile of the individual to process the electrical signals. For example, the portable computing device and/or the application 112 may provide sound tests to evaluate a hearing ability of the individual of the audio system 100 to compute the hearing profile. In yet another embodiment, the portable computing device and/or the application 112 may access and use the hearing profile of the individual stored in a remote server, a storage device, an external device, and the like. Although, the portable computing device and/or the application 112 is described for separating the combined electrical signal into the electrical signals, and compensating the electrical signals for hearing loss of the individual, one can appreciate that the portable computing device and/or the application 112 may include other functionalities as well. Some of the other functionalities include, but are not limited to, processing music and voice controlled operations. The portable computing device and/or the application 112 may include functionalities other than audio processing as well (e.g. image and/or video display or recording, gaming, etc.).

The headset 102 as described herein may correspond to any headset that includes at least two microphones 106A-B. Each microphone may be associated with and placed in proximity of a corresponding speaker of the headset. In one example implementation, the headset 102 may be a stereo headset. The stereo headset may be designed for binaural capturing of acoustic signals by having at least one microphone at each earpiece. The headset 102 may be a miniature ear-fitting headset, or a headset of size that substantially encompass ears of the individual or any other headset which can be used for this disclosure. The headset 102 may be a wired headset that can be communicatively coupled to the portable computing devices such as a portable music player, a mobile communication device, a laptop, Personal Digital Assistant (PDA), and the like, through a connector. In one embodiment, the (wired) headset 102 may be connected to the computing device using a Tip-Ring-Ring-Sleeve (TRRS) connector, which is a well known type of phone connector. The TRRS connector may support three channels. Two channels may be used for the speakers 108A-B and one channel for the microphones 106A-B. In one example implementation, the tip of TRRS connector may connect a channel associated with one of the speakers, for example, the speaker 108A, while the ring adjacent to the tip may connect a channel associated with another of the speakers, for example, the speaker 108B. The second ring adjacent to sleeve and the ring may be a common ground line. The sleeve may connect a channel that is shared by the microphones 106A-B. Other types of connectors for communicatively coupling the headset 102 and the computing device 104 are contemplated herein. The (wired) headset 102 may be powered by the computing device 104.

Alternatively, the headset 102 may be a wireless headset such as Digital Enhanced Cordless Telecommunications (DECT) wireless headsets, 2.4 GHz wireless headset, Bluetooth wireless headsets, and the like, that can be communicatively coupled to the electronic device wirelessly. In some examples, the headset may be a wired and wireless headset. The wireless headset may be powered by batteries. The headset 102 as described above may have active or passive noise cancellation to cancel external noises interfering with the acoustic signals generated by the speakers 108A-B.

The computing device 104 as described herein may be a portable electronic device that is capable of processing the electrical signals received from the microphones 106A-B of the headset 102 and communicating the processed electrical signals to the speakers 108A-B of the headset 102 or produce acoustic signals corresponding to the electrical signals through speakers of the portable electronic device. The computing device 104 may include, but is not limited to, a mobile communication device (e.g. a SmartPhone), a portable music player, a laptop, a PDA and the like. The computing device 104 may be an independent component made of hardware, software, or hardware and software that can be implemented in or in conjunction with the computer-based systems. Those skilled in art can appreciate that computing device 104 may include an operating system as well as various conventional support software and drivers. The application 112 as described may be implemented as a set of computer related instructions. The computing device 104 may be configured to execute the set of computer related instructions. The computer readable instructions of corresponding modules and tools may be loaded onto a general purpose computer, special purpose computer, or other programmable data processing apparatus to produce a machine, such that the instructions that execute on the computer or other programmable data processing apparatus create means for implementing the functions as described herein. These computer program instructions may also be stored in a computer-readable memory that can direct computing devices or other programmable data processing apparatus to function in a particular manner, such that the instructions stored in the computer-readable memory produce an article of manufacture including instruction means which implement the function. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the disclosure. The computing device 104 may be capable of accessing networks or other devices. The computing device 104 may comprise a user interface, e.g. implemented via a touch sensitive display.

Figure 2:
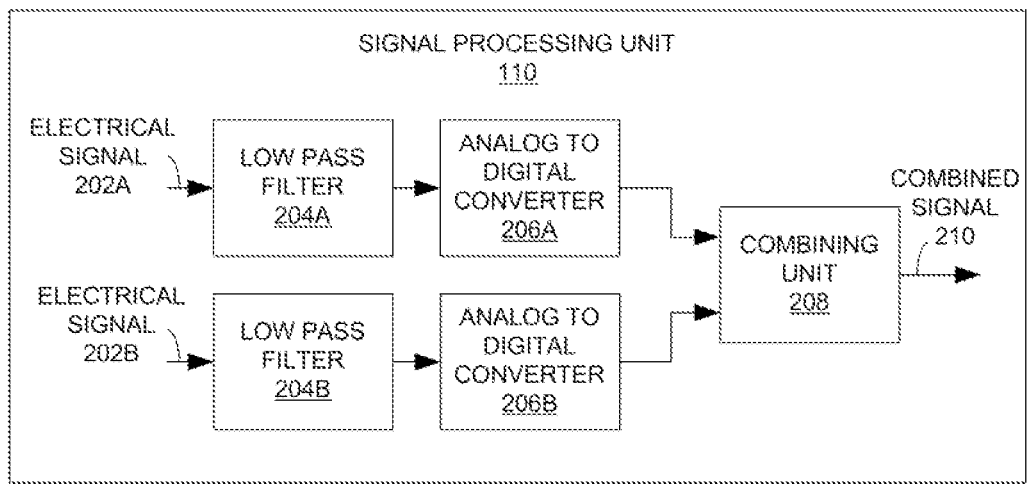
FIG. 2 shows a signal processing unit of the audio system, in accordance with an embodiment of the present disclosure.

FIG. 2 shows a functional block diagram of an exemplary implementation of the signal processing unit 110 of the audio system 100, in accordance with an embodiment of the present disclosure. The signal processing unit 110 may include, low pass filters 204A-B, analog to digital converters 206A-B, and a combining unit 208. The signal processing unit 110 receives electrical signals 202A-202B from the corresponding microphones 106A-B. The low pass filter 204A-B may remove frequency components in the corresponding electrical signals 202A-B that are higher than a first cut-off frequency. The first cut-off frequency may be set based on a sampling rate at which the electrical signals 202A-B may be sampled prior to combining the electrical signals 202A-B. In one example implementation, the first cut-off frequency may be set at a frequency less than or equal to one fourth of the sampling rate. For example, when the sampling frequency is 48 kHz, the first cut-off frequency may be set to 10 kHz.

The analog to digital converter 206 may convert the analog filtered electrical signals 202A-B into digital signals. The analog to digital converter 206 may sample the analog filtered signals 202A-B at the sampling rate. The sampling rate may be set such that the electrical signals can be combined to share the channel. The combining unit 208 combines the digital electrical signals into a combined electrical signal 210. The combining unit 208 generates the combined electrical signal 210 using various combination techniques. Two example techniques are described in FIG. 4A and FIG. 4B. The combining unit 208 preferably comprises a digital to analog converter (not shown) to convert the combined electrical signal 210 to an analog signal. The combining unit 208 may communicate the digital or analog combined electrical signal 210 to the computing device 104 via a single channel.

Though FIG. 2 illustrates an embodiment, where analog to digital conversion is performed after applying a low pass filter to the first and second electrical signals, it need not be so. In alternative embodiments, the first and second electrical signals may first be converted to digital signals using the analog to digital converters. The low pass filters may be designed in the digital domain and applied to the digital versions of the first and the second electrical signals. In further alternative embodiments, the analog to digital converters 206 and the digital to analog converter in the combining unit 208 may be omitted and the combining of the electrical signals may be performed entirely in the analog domain.

Figure 3:
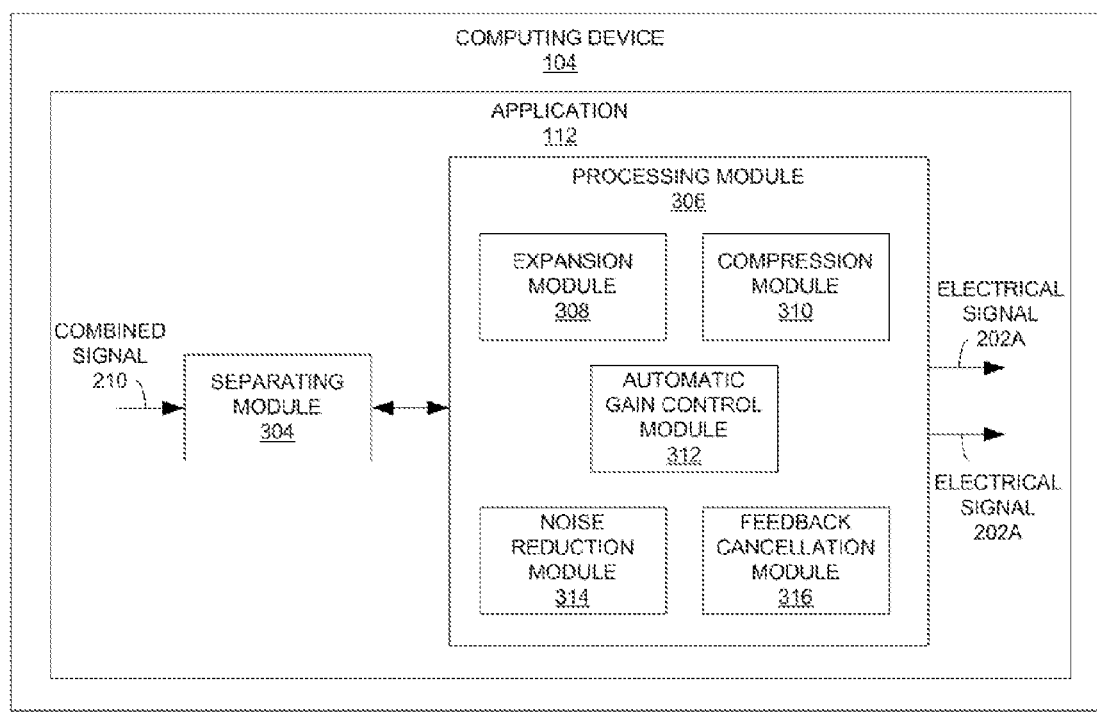
FIG. 3 shows a computing device of the audio system, in accordance with an embodiment of the present disclosure.

FIG. 3 shows a functional block diagram of an exemplary implementation of the computing device 104 of the audio system 100, in accordance with an embodiment of the present disclosure. The computing device 104 includes the application 112. The application 112 separates the combined electrical signal 210 into the electrical signals and processes the electrical signals to compensate for hearing loss of the individual of the audio system 100. The application 112 may include a separating module 304, and a processing module 306. The separating module 304 may receive the combined electrical signal 210 from the signal processing unit 110. The separating module 304 may separate the combined electrical signal 210 into the electrical signals 202A-B. Two exemplary techniques for separating the electrical signals are described in FIG. 4A and FIG. 4B.

The separating module 304 may communicate the electrical signals 202A-B to the processing module 306. The processing module 306 may process the electrical signals to compensate for the hearing loss of the individual. The processing module 306 includes an expansion module 308, a compression module 310, an automatic gain control module 312, a noise reduction module 314 and a feedback cancellation module 316. The expansion module 308 may apply a level expansion in the lower portion of the hearing range of the individual. The expansion may be linear or non-linear. The expansion module 308 may apply the level expansion to the electrical signals 202A-B having levels lower than a first threshold level. The first threshold level may be obtained from the hearing profile of the individual or dynamically determined. In one embodiment, the level expansion may be frequency dependent, i.e., the different gain factors may be applied at different frequencies based upon the individual's hearing loss at these frequencies.

The compression module 310 may apply a level compression to middle and upper portions of the hearing range of the individual. The compression module 310 may compress the levels of the electrical signals 202A-B when the sound pressure is above a second threshold level (threshold knee-point (TK)). An appropriate compression ratio may be applied to compress the levels of the electrical signals beyond the second threshold level. In one example implementation, the compression ratio may be kept high to avoid discomfort due to loud sounds. The second threshold may be determined from the hearing profile or may be dynamically computed. The compression module 310 may be programmed to have minimal or standard Attack Time (AT) and Release (or recovery) time (RT). The AT is the time delay that occurs between the onset of an input signal loud enough (the input signal exceeds the TK) to activate compression and the resulting reduction of gain to a target value. The RT is the time delay that occurs between the offset of the input signal falling below the TK and the resulting increase of gain to its target value. The compression module 310 may incorporate adaptive or variable release time. The automatic gain control module 312 may control the gain of the electrical signals 202A-B based on the level of the electrical signals 202A-B. In one embodiment, the automatic gain control module 312 may incorporate an input-controlled compression (AGC-I), where the level of the electrical signals 202A-B (input) is detected and compression is activated based on the level. In another embodiment, the automatic gain control module 312 may incorporate output-controlled compression (AGC-O), where the level of the electrical signals 202A-B (output) is detected and compression is activated based on the level. The functioning of AGC-I and the AGC-O is well known in the art and hence a detailed explanation is not provided herein for reasons of brevity. The noise reduction module 314 reduces noise in the electrical signals 202A-B. The noise may be an environment noise or a circuit related noise. The noise reduction module 314 may use noise reduction algorithms that are well known in art or proprietary noise reduction algorithms to reduce the noise in the electrical signals 202A-B. The feedback cancellation module 316 may identify any feedback noise in the electrical signals 202A-B due to feedback of the speaker sound into the microphones. The feedback cancellation module 316 may apply notch filtering or feedback canceling techniques to reduce such feedback noise. The processing module 306 may also perform binaural processing of the electrical signals 202A-B to enable the individual to perceive the spatial directions to the source(s) of the sound.

The processing module 306 provides increased gain for soft sounds, maintains medium sounds at a comfortable loudness, and reduces gain for louder inputs to assure listening comfort for the individual. The computing device 104 communicates the electrical signals 202A-B to the speakers 108A-B via corresponding channels.

Although, the application 112 is described for separating the combined electrical signals, and compensating the electrical signals, one can appreciate that the application 112 can also process audio such as music, computing device prompt sounds, and the like, to compensate for hearing loss of the individual. The application 112 may communicate the compensated audio to the speakers 108A-B. Although the application 112 is described for performing the functions of separating and processing the electrical signals 202A-B, one can appreciate that the application 112 can have other functionalities as well.

Figure 4A:
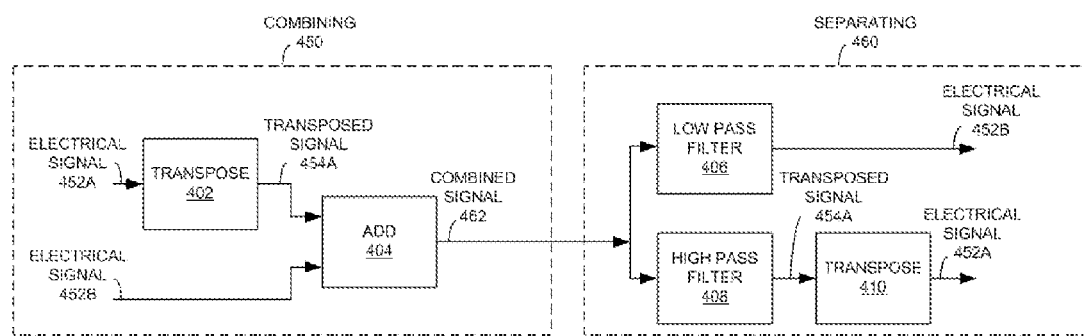
FIG. 4A-B shows exemplary techniques for combining and separating electrical signals, in accordance with an embodiment of the present disclosure.
Figure 4B:
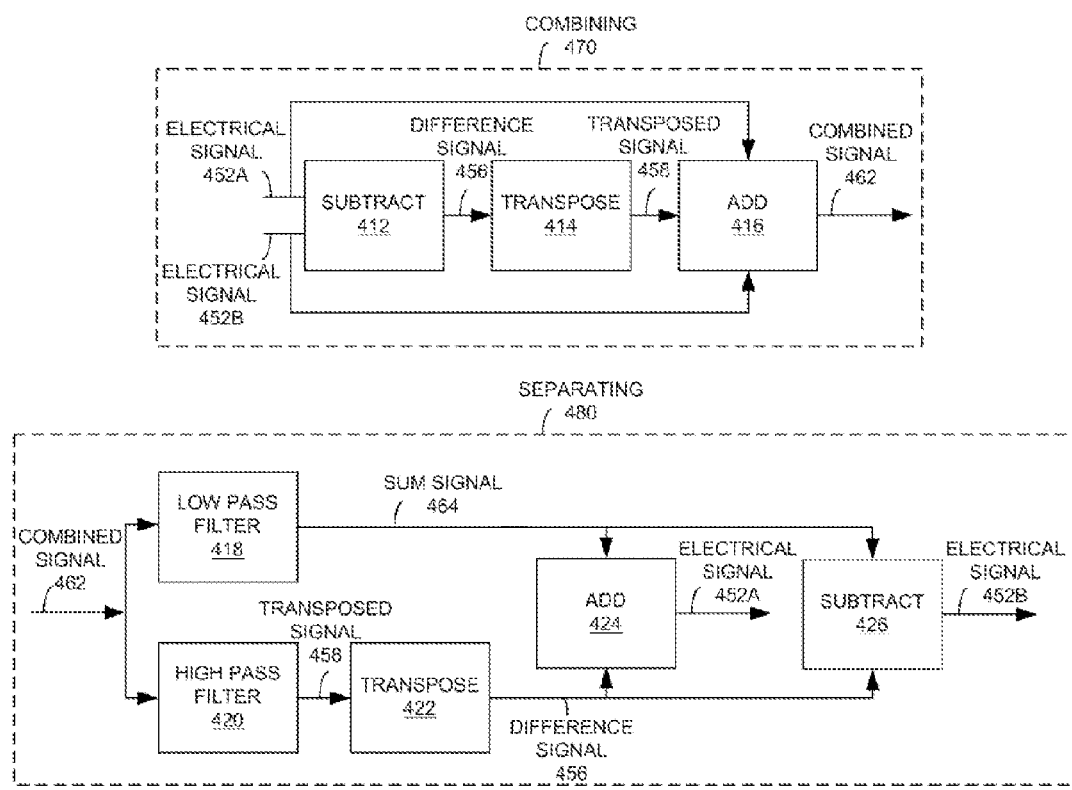

FIG. 4A-B shows exemplary techniques for combining and separating the electrical signals, in accordance with various embodiments of the present disclosure. FIG. 4A illustrates a combining block 450 and a separating block 450. The combining block 450 represents an operation for combining electrical signals 452A-B (performed by the combining unit 208). The separating block 450 represents a separation operation for separating a combined electrical signal 462 into the electrical signals 452A-B (performed by the separating module 304).

In the combining operation 450 of FIG. 4A, the combining unit 208 may receive the electrical signals 452A-B from the corresponding analog to digital converters 206A and 206B, respectively. According to one embodiment, the combining unit 208 may transpose (block 402 in FIG. 4B) the electrical signal 452A by a first frequency shift to frequencies above the first cut-off frequency. The combining unit 208 may add (block 404 in FIG. 4A) the transposed signal 454A and the digital electrical signal 452B to generate the combined electrical signal 462. In the separating operation 460, the separating module 304 applies a low pass filter (block 406 in FIG. 4A) with a cut-off frequency equal to the first cut-off frequency (the cut-off frequency at which the electrical signals 452A-B were low pass filtered using the low pass filters 204A-B) to the combined electrical signal 462. The signal obtained as a result of application of the low pass filter 406, is the electrical signal 452B. The separating module 304 also applies a high pass filter (block 408 in FIG. 4A) with a cut-off frequency somewhere in the range between the first cut-off frequency and the first frequency shift to the combined electrical signal 462. The resultant filtered signal is the transposed signal 454A. The separating module 304 transposes (block 410 in FIG. 4A) the high passed filtered signal back to the original frequencies below the first cut-off frequency. The resulting signal is the electrical signal 452A. Thus, the electrical signals 452A-B are separated. The electrical signals 452A-B are communicated for further processing.

FIG. 4B illustrates a different, but related technique for combining and separating electrical signals. FIG. 4B illustrates a combining block 470 and a separating block 480. The combining block 470 represents an operation for combining the electrical signals 452A-B performed by the combining unit 208. In combining operation 470, the combining unit 208 may receive the electrical signal 452A-B. The combining unit 208 may generate a difference signal 456 by subtracting (block 412 in FIG. 4B) the second electrical signal 452B from the first electrical signal 452A. Subsequently, the combining unit 208 may transpose (block 414 in FIG. 4B) the difference signal 456 by a first frequency shift to frequencies above the first cut-off frequency to generate a transposed signal 458. The combining unit 208 adds (block 416 in FIG. 4B) the transposed signal 458 and the electrical signals 452A-B to generate the combined electrical signal 462.

The separating block 480 represents a separation operation for separating the combined electrical signal 462 into the electrical signals 452A-B (performed by the separating module 304). The separating module 304 receives the combined electrical signal 462. The separating module 304 may apply a low pass filter (block 418 in FIG. 4B) with a cut-off frequency equal to the first cut-off frequency (the cut-off frequency with which the electrical signals 452A-B were low pass filtered using the low pass filter 204A-B) to the combined electrical signal 462. The signal obtained as a result of application of the low pass filter 406 is a sum signal 464 (a signal representing a sum of the electrical signals 452A-B). The separating module 304 may apply a high pass filter (block 420 in FIG. 4B) with a cut-off frequency somewhere in to range between the first cut-off frequency and the first frequency shift to the combined electrical signal 462 to obtain the transposed signal 458. The separating module 304 may transpose (block 422 in FIG. 4B) the obtained transposed signal 458 back to the original frequencies below the first cut-off frequency to obtain the difference signal 456. The separating module 304 may add (block 424 in FIG. 4B) the difference signal 456 and the sum signal 464 to obtain the electrical signal 452A. The separating module 304 may subtract (block 426 in FIG. 4B) the difference signal 456 from the sum signal 464 to obtain the electrical signal 452B. The technique of combining and separating the electrical signals 452A-B described in FIG. 4B causes even distribution of the noise and processing artifacts between the two electrical signals 452A-B.

Although two example techniques are provided for combining and separating the two electrical signals, it should be appreciated that other techniques for combining and separating the signals are contemplated herein. The disclosed techniques, as well as other suitable techniques, may be extended to combine and separate more than two, e.g. four or six or even more electric signals from corresponding microphones in the headset. This allows for forming and processing directionally dependent microphone signals in the portable computing device in order to provide sounds with increased signal-to-noise ratio to the user.

Figure 5:
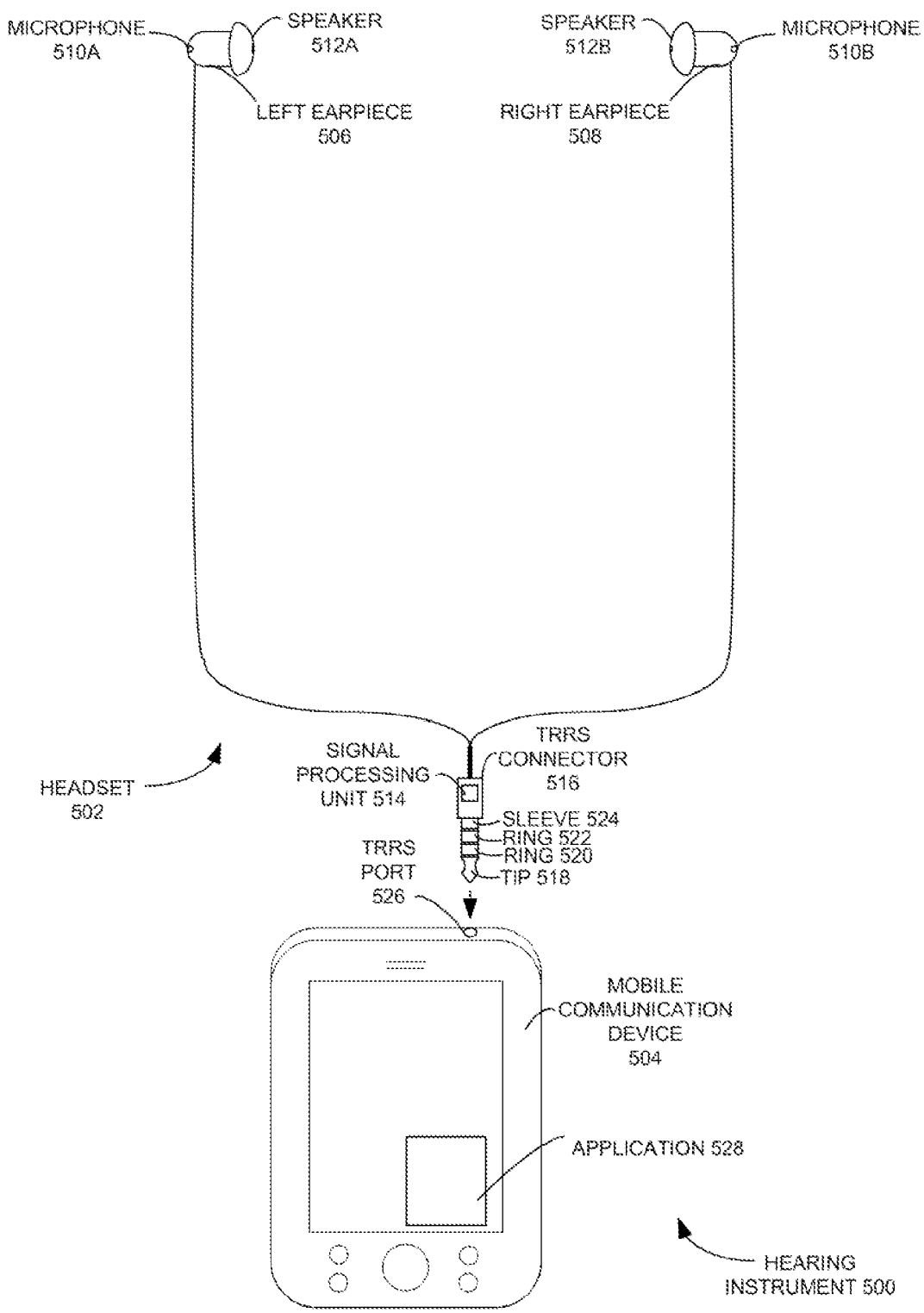
FIG. 5 shows a hearing instrument, in accordance with an embodiment of the present disclosure.

FIG. 5 shows a hearing instrument 500 designed according to one or more embodiments of the current disclosure. The hearing instrument 500 includes a stereo headset 502, and a mobile communication device 504. The stereo headset 502 includes a left earpiece 506, a right earpiece 508, a signal processing unit 514 and a TRRS connector 516. The left earpiece 506 includes a microphone 510A and a speaker 512A co-located to each other. The right earpiece 508 includes a microphone 510B and a speaker 512B co-located to each other. The signal processing unit 514 communicatively couples the set of microphones 510A-B and the speakers 512A-B with the TRRS connector 516. In one embodiment, a tip 518 of the TRRS connector 516 may be a speaker contact electrically coupling a channel associated with the speaker 512A. A ring 520 adjacent to the tip 518 of the TRRS connector 516 may be another speaker contact electrically coupling a channel associated with the speaker 512B. A second ring 522 adjacent to a sleeve 524 and the ring 520 may be a ground line. The sleeve 524 may be a microphone contact electrically coupling a channel associated with the microphones 510A-B. Since there is more than one microphone and one channel for the microphones 510A-B, the signal processing unit 514 is configured to combine the electrical signals and to communicate a combined electrical signal via the channel connecting the microphone contact. The TRRS connector 516 may be designed to be physically and electrically couple with a corresponding TRRS port 526. The TRRS port 526 may be located on the mobile communication device 504. Having the microphones 510A-B co-located with corresponding speakers 512A-B of the stereo headset 502 enables the hearing instrument 500 for realizing a binaural hearing aid.

The signal processing unit 514 may be comprised in a housing integral with the TRRS connector 516, or alternatively be comprised in one of the earpieces 506, 508, or as a further alternative comprised in a separate housing. The housing signal processing unit 514 may include a volume control, one or more push buttons and one or more visual indicators, such as a Light Emitting Diode (LED). The volume control may be used to adjust the volume of the signals sent to the speakers 512. Alternatively, an electric output signal of the volume control may be coded onto the combined electric signal and correspondingly be decoded in the mobile communication device 504, e.g. in the application, to provide a user control input to the hearing aid signal processing. Outputs of the one or more pushbuttons may be coded/decoded in a similar way to provide user controllable functions in the hearing aid or in the mobile communication device 504, such as e.g. hearing-aid program change or accepting a phone call. Furthermore, the mobile communication device 504 may launch the application upon detecting such coded user input in the microphone input. Also, the headset may function as a standard headset that just provides one of the microphone signals or a sum of these to the connector when a power signal, or another suitably coded signal, from the mobile communication device 504 is absent. Alternatively, a user interface for controlling the hearing aid functions may be implemented in the mobile communication device 504 (e.g. as an APP, e.g. using activation elements, e.g. a touch sensitive display, of the mobile communication device).

The signal processing unit 514 may be supplied with power by a battery, e.g. a rechargeable battery, comprised in the same housing as the signal processing unit 514. Alternatively, the signal processing unit 514 may be supplied with power from the mobile communication device 504, e.g. by means of a DC voltage applied to the speaker contacts of the TRRS port 526.

The microphones 510A-B capture acoustic signals and convert the captured acoustic signals into electrical signals. The signal processing unit 514 receives the electrical signals from each of the microphones 510A-B. In embodiments, the signal processing unit 514 processes the electrical signals to generate a combined electrical signal. As described above, the signal processing unit 514 may process the electrical signals by applying a low pass filter with a first cut-off frequency, convert the filtered electrical signals into digital signals, combine the digitized electrical signal into the combined electrical signal, and convert the combined electrical signal into an analog signal. The first cut-off frequency is set to a frequency less than one fourth of the sampling frequency. To elaborate with an example, the sampling frequency may be 48 kHz and the first cut-off frequency may be set to 10 kHz. The signal processing unit 514, thus, applies low-pass filter on the signals to retain frequencies below 10 kHz. Subsequently, the signal processing unit 514 may convert the analog electrical signals to digital electrical signals. In one example implementation, the signal processing unit 514 may frequency transpose the digital signal corresponding to the microphone 510A (of the left earpiece 506) by, for example, 10 kHz to the range between 10 kHz and 20 kHz. The signal processing unit 514 may add the transposed signal and the digital signal corresponding to the microphone 510B (of the right earpiece 508) to generate the combined electrical signal. The signal processing unit 514 converts the combined electrical signal into an analog signal. The signal processing unit 514 may communicate the analog combined electrical signal to the mobile communication device 504 via a single channel (in the current example, via the microphone contact (sleeve 524) of TRRS connector 516).

The mobile communication device 504 may include an application 528 that processes the combined electrical signal. The application 528 receives and separates the combined electrical signal into corresponding electrical signals. In the current example, the application 528 may apply a low pass filter with a cut-off frequency equal to the first cut-off frequency (that is 10 kHz) to the combined electrical signal. The filtered signal is the electrical signal corresponding to the microphone 510B. The application 528 may apply a high pass filter with a cut-off frequency somewhere in the range between the first cut-off frequency and the first frequency shift (in this case 10 kHz as the first cut-off frequency and the first frequency shift both equal 10 kHz) to the combined electrical signal to obtain the transposed signal. The application 528 may transpose the obtained transposed signal back to the original frequencies below the first cut-off frequency (that is 10 kHz), to obtain the electrical signal corresponding to the microphone 510A. The transposition during separation is thus preferably opposite in direction and equal in magnitude to the transposition applied during combining.

The application 528 communicates the processed electrical signals to the speakers 512A-B through corresponding channels. The speakers 512A-B may convert the processed electrical signals to acoustic signals. The acoustic signals generated as a result of electrical signals at corresponding speakers enable the individual to perceive the direction to a single or multiple sources of acoustics. In one embodiment, the application 528 may use the hearing profile of the individual to process the electrical signals from the stereo headset 502. Alternatively, the application 528 dynamically process the electrical signals based on sound tests conducted through the stereo headset 502.

The mobile communication device 504 may detect the stereo headset 502 when the stereo headset 502 is plugged into the mobile communication device 504. Responsive to detecting, the mobile communication device 504 may provide an option to the individual to select the purpose of the stereo headset 502. Responsive to selection of an option of hearing aid, the application 528 may be activated. Alternatively, the application 528 in the mobile communication device 504 may process the electrical signals from the stereo headset 502 without requiring any individual's action. The stereo headset 502 may be powered by the mobile communication device 504.

In an embodiment, the headset is or comprises a wired connection, e.g. comprising a phone connector or audio jack, e.g. mini-jack, or a mini- or micro-USB connector. This is of a particular advantage in applications where delay/latency is an important feature and should be minimized. Wireless links typically incur larger delays due to various processing involved in the (e.g. digital) wireless transmission and reception, e.g. coding, decoding, error correction, etc. Alternatively, the use of a wired connection allows the use of additional processing algorithms (such as e.g. noise reduction and compression) to improve the audio quality without increasing the processing delay (compared to a wireless solution).

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention. For example, the ear pieces are generally described as comprising speakers, typically referring to loudspeakers in a normal sense (adapted for creating vibrations in air). Alternatively, an ear piece may comprise a vibrator, e.g. of a bone anchored hearing aid, specifically adapted for creating vibrations in a solid, e.g. human bone, or liquid material.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An audio system, comprising:
a headset and a portable computing device;
the headset comprising:
   a first speaker and a first microphone, the first microphone outputting a first electrical signal;
   a second speaker and a second microphone, the second microphone outputting a second electrical signal,
   a processing unit, the processing unit configured to:
     receive the first electrical signal, and the second electrical signal;
     combine the first electrical signal and the second electrical signal into a third electrical signal; and
     communicate the third electrical signal to a portable computing device through an output channel;
the portable computing device being configured to:
   separate the third electrical signal into the first electrical signal and the second electrical signal;
   process the first electrical signal and the second electrical signal to compensate for a hearing loss of an individual of the audio system; and
   communicate the processed first electrical signal to the first speaker through a first channel, and the processed second electrical signal to the second speaker through a second channel, wherein
the processing unit combines the first signal and the second signal by:
   applying a low pass filter with a first cut-off frequency to the first electrical signal and the second electrical signal;
   transposing the filtered first electrical signal by a first frequency shift to frequencies above the first cut-off frequency; and
   adding the transposed first electrical signal and the filtered second electrical signal.

2. The audio system of claim 1, wherein the headset is configured to be communicatively coupled to the computing device through a connector, wherein the connector comprises:
a first speaker contact, coupled to the first speaker through the first channel;
a second speaker contact coupled to the second speaker through the second channel; and
a microphone contact coupled to the output channel.

3. The audio system of claim 1, wherein the portable computing device is at least one of a mobile communication device, a portable music player, a personal digital assistant (PDA), a laptop and a computer.

4. An audio system, comprising:
a headset and a portable computing device;
the headset comprising:
   a first speaker and a first microphone, the first microphone outputting a first electrical signal;
   a second speaker and a second microphone, the second microphone outputting a second electrical signal, a processing unit, the processing unit configured to:
  receive the first electrical signal, and the second electrical signal;
  combine the first electrical signal and the second electrical signal into a third electrical signal; and
  communicate the third electrical signal to a portable computing device through an output channel;
the portable computing device being configured to:
  separate the third electrical signal into the first electrical signal and the second electrical signal;
  process the first electrical signal and the second electrical signal to compensate for a hearing loss of an individual of the audio system; and
  communicate the processed first electrical signal to the first speaker through a first channel, and the processed second electrical signal to the second speaker through a second channel,
wherein the processing unit combines the first signal and the second signal by:
  applying a low pass filter with a first cut-off frequency to the first electrical signal and the second electrical signal;
  generating a difference signal by subtracting the filtered second electrical signal from the filtered first electrical signal;
  transposing the difference signal by a first frequency shift to frequencies above the first cut-off frequency; and
  adding the transposed signal and the first electrical signal and the second electrical signal.

5. The audio system of claim 1, wherein the portable computing device separates the third electrical signal by:
  applying a low pass filter with a cut-off frequency equal to the first cut-off frequency to the third electrical signal to obtain the second electrical signal;
  applying a high pass filter with a cut-off frequency in the range between the first cut-off frequency and the first frequency shift to the third electrical signal; and
  frequency transposing the high-passed filtered signal to frequencies below the first cut-off frequency to obtain the first electrical signal.

6. The audio system of claim 4, wherein the portable computing device separates the third electrical signal by:
  applying a low pass filter with a cut-off frequency equal to the first cut-off frequency to the third electrical signal to obtain a sum signal corresponding to the sum of the first electrical signal and the second electrical signal;
  applying a high pass filter with a cut-off frequency in the range between the first cut-off frequency and the first frequency shift to the third electrical signal;
  transposing the high-pass filtered signal to frequencies below the first cut-off frequency to obtain a difference signal;
  adding the difference signal and the sum signal, to obtain the first electrical signal; and
  subtracting the difference signal from the sum signal, to obtain the second electrical signal.

7. A data processing system, comprising a processor programmed to:
  receive an electrical signal from a headset through an input channel, wherein the headset comprises a first a first speaker, a first microphone, a second speaker and a second microphone, wherein the electrical signal is comprised of a combination of a first electrical signal output by the first microphone and a second electrical signal output by the second microphone;
  separate the electrical signal into the first electrical signal and the second electrical signal;
  process the first electrical signal and the second electrical signal to compensate for a hearing loss of an individual of the data processing system; and
  communicate the processed first signal to the first speaker through a first channel, and the second signal to the second speaker through a second channel, wherein
the combination of the first electrical signal and the second electrical signal is created by
  applying a low pass filter with a first cut-off frequency to the first electrical signal and the second electrical signal;
  transposing the filtered first electrical signal by a first frequency shift to frequencies above the first cut-off frequency; and
  adding the transposed first electrical signal and the filtered second electrical signal.

8. A hearing instrument, comprising:
a stereo headset and a portable computing device;
the stereo headset comprising:
  a first earpiece comprising a first speaker and a first microphone, the first microphone outputting a first electrical signal;
  a second earpiece comprising a second speaker and a second microphone, the second microphone outputting a second electrical signal;
  a processing unit, coupled to the first earpiece and the second earpiece, configured to:
    receive the first electrical signal and the second electrical signal;
    combine the first electrical signal and the second electrical signal to form a third electrical signal; and
    send the third electrical signal to the portable computing device via an output channel;
  a connector, coupled to the first earpiece and the second earpiece, to connect the stereo headset to the portable computing device, wherein the connector comprises:
    a first speaker contact, coupled to the first speaker through a first channel;
    a second speaker contact, coupled to the second speaker through a second channel; and
    a microphone contact, coupled to the processing unit through the output channel;
the portable computing device being configured to:
  separate the third electrical signal into the first electrical signal and the second electrical signal;
  process the first electrical signal and the second electrical signal to compensate for a hearing loss of an individual of the audio system; and
communicate the processed first electrical signal to the first speaker through the first channel, and the processed second electrical signal to the second speaker through the second channel, wherein the processing unit combines the first signal and the second signal by:
  applying a low pass filter with a first cut-off frequency to the first electrical signal and the second electrical signal;
  transposing the filtered first electrical signal by a first frequency shift; and
  adding the transposed first electrical signal and the filtered second electrical signal.

9. A hearing instrument, comprising:
a stereo headset and a portable computing device;
the stereo headset comprising:
  a first earpiece comprising a first speaker and a first microphone, the first microphone outputting a first electrical signal;
  a second earpiece comprising a second speaker and a second microphone, the second microphone outputting a second electrical signal;
  a processing unit, coupled to the first earpiece and the second earpiece, configured to:
    receive the first electrical signal and the second electrical signal;
    combine the first electrical signal and the second electrical signal to form a third electrical signal; and
    send the third electrical signal to the portable computing device via an output channel; and
  a connector, coupled to the first earpiece and the second earpiece, to connect the stereo headset to the portable computing device, wherein the connector comprises:
    a first speaker contact, coupled to the first speaker through a first channel;
    a second speaker contact, coupled to the second speaker through a second channel; and
    a microphone contact, coupled to the processing unit through the output channel;
the portable computing device being configured to:
  separate the third electrical signal into the first electrical signal and the second electrical signal;
  process the first electrical signal and the second electrical signal to compensate for a hearing loss of an individual of the audio system; and
  communicate the processed first electrical signal to the first speaker through the first channel, and the processed second electrical signal to the second speaker through the second channel, wherein
the processing unit combines the first signal and the second signal by:
  applying a low pass filter with a first cut-off frequency to the first electrical signal and the second electrical signal;
  generating a difference signal by subtracting the filtered second electrical signal from the filtered first electrical signal;
  frequency transposing the difference signal by a first frequency shift to frequencies above the first cut-off frequency; and
  adding the transposed signal, the first electrical signal and the second electrical signal.

10. The hearing instrument of claim 8, wherein the portable computing device separates the third electrical signal by:
  applying a low pass filter with a cut-off frequency equal to the first cut-off frequency to the third electrical signal, to obtain the second electrical signal;
  applying a high pass filter with a cut-off frequency equal to the first cut-off frequency to the third electrical signal; and
  transposing the high-pass filtered signal to frequencies below the first cut-off frequency, to obtain the first electrical signal.

11. The hearing instrument of claim 9, wherein the portable computing device separates the third electrical signal by:
  applying a low pass filter with a cut-off frequency equal to the first cut-off frequency to the third electrical signal to obtain a sum signal corresponding to the sum of the first electrical signal and the second electrical signal;
  applying a high pass filter with a cut-off frequency in the range between the first cut-off frequency and the first frequency shift to the third electrical signal;
  transposing the high-pass filtered signal to frequencies below the first cut-off frequency to obtain a difference signal;
  adding the difference signal and the sum signal, to obtain the first electrical signal; and
  subtracting the difference signal from the sum signal, to obtain the second electrical signal.

12. A stereo headset, comprising:
a first earpiece comprising a first speaker and a first microphone, the first microphone outputting a first electrical signal;
a second earpiece comprising a second speaker and a second microphone, the second microphone outputting a second electrical signal;
a processing unit, coupled to the first earpiece and the second earpiece;
a connector, coupled to the first earpiece and the second earpiece, to connect the stereo headset to a portable computing device, wherein the connector comprises:
  a first speaker contact, coupled to the first speaker through a first channel;
  a second speaker contact, coupled to the second speaker through a second channel; and
  a microphone contact, coupled to the processing unit through a single wired output channel;
the processing unit being configured to:
  receive the first electrical signal and the second electrical signal;
  combine the first electrical signal and the second electrical signal to form a third electrical signal; and
  send the third electrical signal via the single wired output channel,
wherein the processing unit combines the first signal and the second signal by:
  applying a low pass filter with a first cut-off frequency to the first electrical signal and the second electrical signal;
  transposing the filtered first electrical signal by a first frequency shift; and
  adding the transposed first electrical signal and the filtered second electrical signal.

13. An audio system according to claim 1 comprising a user interface for controlling the functions of the audio system.

14. An audio system according to claim 13 wherein said user interface is implemented in the portable computing device.

15. An audio system according to claim 13 wherein said user interface is implemented in a mobile communication device using an APP.

16. The audio system according to claim 1, wherein
the processing unit of the headset is configured to communicate the third electrical signal to the portable computing device through a single wired output channel.

17. The audio system according to claim 16, wherein
the headset is configured to be communicatively coupled to the computing device through a connector, wherein the connector comprises:
a first speaker contact, coupled to the first speaker through the first channel;
a second speaker contact coupled to the second speaker through the second channel; and
a microphone contact coupled to the single wired output channel.

18. The data processing system according to claim 7, wherein
the processor is configured to receive the electrical signal from the headset through a single wired input channel.

19. The hearing instrument according to claim 8, wherein
the processing unit is configured to send the third electrical signal to the portable computing device via a single wired output channel, and
the microphone contact of the connector is coupled to the processing unit through the single wired output channel.

* * * * *